United States Patent [19]

Kay et al.

[11] Patent Number: 4,742,100

[45] Date of Patent: May 3, 1988

[54] POLYURETHANES CONTAINING AMINE SALTS

[75] Inventors: Edward L. Kay, Akron; Kenneth B. Roskos, Clinton, both of Ohio

[73] Assignee: The Firestone Tire & Rubber Company, Akron, Ohio

[21] Appl. No.: 26,421

[22] Filed: Mar. 16, 1987

[51] Int. Cl.$^4$ ............................................. C08L 75/00
[52] U.S. Cl. .................... 524/238; 524/239; 524/722; 524/724; 528/71
[58] Field of Search ............... 524/238, 239, 722, 724; 528/71

[56] References Cited

U.S. PATENT DOCUMENTS 4,419,461  12/1963  Arbir et al. ........................ 528/71
4,666,967  5/1987   Richardson et al. ............... 528/71

FOREIGN PATENT DOCUMENTS 1076688  6/1967  United Kingdom .
1078202  8/1967  United Kingdom .

OTHER PUBLICATIONS

Polyurethane Ionomers, A New Class of Block Polymers, by: D. Dieterich, et al—Angew. Chem. Internat. Edit., vol. 9 (1970).
Properties of Polyether-Polyurethane Zwitterionomers, by: Kirk K. S. Hwang, et al—Polymer Engineering and Science, Oct. 1981, vol. 21, No. 15.
Morphology and Properties of Polybutadiene- and Polyether-Polyurethane Zwitterionomers, by: Chang-Zheng Yang, et al—Die Makromolekulare Chemie, U. 184, 1983, p. 651–end.
Properties of Polymer-Polyurethane Anionomers, by: J. A. Miller, et al—J. Macromol. Sce.-Phys., B22 (2), 321–341 (1983).
Properties of Polyurethane Ionomers, by: J. A. Miller, et al—Journal of Elastomers and Plastics, vol. 15 (Jul. 1983).
Properties of Polyurethane Anionomers: Ionization via Bimolecular Nucleophilic Displacement of the Urethane Hydrogen, by: K. K. S. Hwang, et al—J. Macromol. Sci.-Phys., B23 (2) 153–174 (1984).
Properties of Segmented Polyurethane Zwitterionomer Elastomers, by: T. A. Speckhard, et al—J. Macromol. Sci.-Phys., B23 (2), 175–199 (1984).

*Primary Examiner*—Maurice J. Welsh
*Attorney, Agent, or Firm*—Daniel N. Hall

[57] ABSTRACT

Salts generally act as reinforcing compounds in polyurethane compositions. Salts containing a free-amine function generally increase the low-strain moduli more than salts which lack such free-amine functions or are neutral. The salts are generally formed by reacting a basic nitrogen function compound such as a monoamine or a diamine with a mono or a dicarboxylic acid.

18 Claims, No Drawings ures, D. Dieterich,
POLYURETHANES CONTAINING AMINE SALTS

FIELD OF THE INVENTION

The present invention relates to a polyurethane composition containing a basic nitrogen function compound as a reinforcing compound. More specifically, the present invention relates to amine salts which are either incorporated into a polyurethane molecule or exist as a reinforcing filler.

BACKGROUND

Numerous articles have been published and patents granted concerning polyurethanes. For example, polyurethane ionomers were produced by incorporating ionic centers into linear polyurethanes, D. Dieterich, W. Keberle, and H. Witt, *Angew. Chem. Int. Ed.*, 9, 40 (1970). Thus, sultones (zwitterion ammoniosulfonates) can be converted into cationic ionomers by quaternization, D. Dieterich and O. Bayer, Brit. Pat. No. 1078202, Farbhenfabriken Bayer, and into anionic ionomers by reaction with bases, W. Keberle and D. Dieterich, Brit. Pat. No. 1076688, Farbenfabriken Bayer.

Polyurethane ionomers have been reported to possess improved mechanical properties primarily because of more effective phase separation of hard and soft segments and increased domain cohesion of hard segments, see D. Dieterich, W. Keberle, and H. Witt, *Angew. Chem. Int. Ed.*, 9, 40 (1970); K. K. S. Hwang, C. S. Yang, and S. L. Cooper, *Polym. Eng. Sci.*, 21, 1027 (1981); C. Z. Yang, K. K. S. Hwang, and S. L. Cooper, *Makromol. Chem.*, 184, 651 (1983); J. A. Miller, K. K. S. Hwang, and S. L. Cooper, *J. Macromol. Sci.-Phys.* B22, 321 (1983); J. A. Miller, K. K. S. Hwang, C. Z. Yang, and S. L. Cooper, *J. Elast. Plast.*, 15, 174 (1983); K. K. S. Hwang, T. A. Speckhard, and S. L. Cooper, *J. Macromol. Sci.-Phys.*, B23, 153 (1984); and T. A. Speckhard, K. K. S. Hwang, C. Z. Yang, W. R. Laupan, and S. L. Cooper, *J. Macromol. Sci.-Phys.*, B23, 175 (1984).

The above patents and articles, however, lack any teaching of the use of nitrogen containing salts as reinforcing agents in polurethane compositions or as being incorporated therein.

SUMMARY OF THE INVENTION

Accordingly, it is an aspect of the present invention to provide a polyurethane composition containing a salt therein.

It is a further aspect of the present invention to provide a salt containing polyurethane composition, as above, wherein said salt is the reaction product of a basic nitrogen function compound and a monocarboxylic acid or a dicarboxylic acid.

It is still a further aspect of the present invention to provide a salt containing polyurethane composition, as above, wherein the polyurethane has an improved low-strain moduli.

It is yet another aspect of the present invention to provide a salt containing polyurethane composition, as above, wherein said urethane has hard and soft segments.

A polyurethane composition comprises a polyurethane and an effective amount of a salt to increase the low-strain moduli of said polyurethane.

PREFERRED EMBODIMENTS

The salts of the present invention are added to conventional polyurethanes, generally during the preparation thereof. As well known to those skilled in the art, polyurethanes are prepared by chain extending (curing) a urethane prepolymer. The term "curing agent" is used interchangably with the term "chain extender" throughout this Specification. If the chain extender is a diol, a polyurethane is formed. If the chain extender is a diamine, a polyurea is formed.

Regardless of whether the chain extender or curing agent utilized is a diol or a diamine, it is to be understood for the purposes of this invention that the term "polyurethane" is utilized in a generic manner to include both situations. Thus, hereinafter, only the term "polyurethane" will be utilized although it is meant to include polymers formed by chain extention with a polyamine.

The prepolymers are made by the reaction of various polyisocyanates with conventional low or intermediate molecular weight polymers generally containing hydroxyl or amine end groups. The molecular weight of the intermediate is generally from about 100 to about 10,000. The low or intermediate molecular weight polymer is generally a hydroxyl or amine terminated polyether, polyalkene, polyester, or a mixed polyester-polyamide, and is characterized by having two or more such hydroxyl and/or amine groups which react with the isocyanate functions of the polyisocyanate. Generally, the hydroxyl and/or amine functions are limited to two per molecule as well as two isocyanate functions per molecule of polyisocyanate to obtain a linear (non-crosslinked) polyurethane (polyurea) when cured with a difunctional curing agent. If a crosslinked polyurethane is desirable, a trifunctional agent can be utilized such as a triol, a triamine, or a triisocyanate.

Examples of suitable intermediates include poly(isobutene)diol, poly(butadiene)diol, poly(oxyethylene)diol, poly(oxypropylene)diol, poly(oxybutylene)diol, poly(caprolactone)diol, polyester diols such as poly(hexanediol-adipate)diol, and the like, as well as the triol and analogous amine derivatives thereof.

The intermediate is reacted with a conventional polyisocyanate to form a prepolymer. Suitable polyisocyanates include those having the formula R—(N=C=O)$_n$, where R can be an aliphatic containing from about 2 to about 20 carbon atoms, a cycloaliphatic containing from 5 to about 20 carbon atoms, an aromatic containing from 6 to about 20 carbon atoms, or combinations thereof, as for example, alkyl-substituted aromatics. Desirably R is an aromatic or an alkyl substituted aromatic group having from 6 to 14 carbon atoms. The number of isocyanate groups, that is "n" is an integer such as 2, 3, or higher with 2 being highly preferred. Examples of polyisocyanates include the following as well as isomers thereof; diphenyl diisocyanates; 2,4,4'-triisocyanate diphenylether; triphenylmethane triiosocyanate; benzene-1,2,4-triiosocyanate; naphthalene-1,3,7-triisocyanate and the like. Highly preferred polyisocyanates include meta or para-phenylene diisocyanate; diphenylmethane diisocyanates; ditolylene diisocyanates; dianisidine diisocyanates; isophorone diisocyanates; toluene diisocyanates; hexamethylene diisocyanate; pentamethylene diisocyanate; and MDI; that is 4,4'-diphenylmethane diisocyanate.

The amount of polyisocyanate utilized is generally from about 0.90 to about 1.10 equivalents of isocyanate function (NCO) for each hydroxyl or amine equivalent, desirably from about 0.95 to about 1.05 equivalents and preferably about 1.0 equivalent. These "equivalent ranges" are based on the total amount of hydroxyl or amine equivalents used in the system; that is, the hydroxyl or amine equivalents include the amounts supplied by the intermediate polyol (polyamine) and the chain extender (diol or diamine).

After the prepolymer is formed or when such prepolymer is commercially obtained, it can be cured by chain extension with various conventional chain extending or curing agent compounds. The conventional chain extending or curing agents of the present invention are generally conventional polar compounds which react with the free isocyanate functions of the prepolymers to chain extend the same. Such chain extending or curing agents are various polyols or amine analogs thereof and have a molecular weight of 300 or less, desirably 100 or less. The chain-extending polyols or amine analogs thereof can be aromatic, aliphatic such as alkyl, or combinations thereof and generally have from about 2 to about 20 carbon atoms and preferably from about 4 to 8 carbon atoms. Suitable types of polyols include the various low molecular weight alkyl diols such as ethylene glycol, 1,3-propanediol, 2-methyl-1,3-propanediol, 1,4-butanediol, and the like. Amine analogs of such polyols can also be used as well as mixed amine/ols such as ethanol amine, 3-aminopropanol, 1,3-diaminopropanol-2, and the like. Aromatic amines such as o-, m- or p-phenylenediamine and o-, m- or p-aminophenol and the like can also be used. Additionally, trifunctional alcohols such as glycerine, trimethanol propane, i.e. (2-ethyl-(hydroxymethyl)-1,3-propanediol) and the like can be used. Trifunctional amines as well as trifunctional mixed ol/amines can also be used.

The prepolymer can be chain extended with the curing agents generally at a temperature of from about 20° C. to about 100° C. and allowed to proceed until a mild exotherm is observed, for example about 5° C. to 10° C. The reaction mixture generally containing the amine salts therein can be poured into a suitable mold and cured at a curing temperature, for example from about 100° C. to about 200° C. and preferably from about 120° C. to about 180° C. until cured, which is generally from about 5 to about 60 minutes. The curing can be conducted under pressure; for example, curing at cure temperature under atmospheric pressure to about 20 tons per square inch.

The salts utilized in the present invention are known to the art as well as to the literature. The salts of the present invention are generally the reaction product of a basic nitrogen function compound such as an amine with a monocarboxylic acid and/or a dicarboxylic acid. The various carboxylic acids are also known to the literature as well as to the art and, hence, conventional acids may be utilized. For purposes of clarity, ammonia is defined as an amine. In addition, mono-, di-, tri-, etc. amines are included as well as other basic compounds such as urea and substituted urea which contain a nitrogen function sufficiently basic to form a salt with the carboxylic acids. By "substituted urea" it is meant that one or more hydrogens attached to the nitrogen atom have been replaced with an alkyl, aromatic, or alkylaromatic group having from 1 to 20 carbon atoms. The various amine compounds are preferred. The amines can be primary, secondary, or tertiary. That is, a primary amine having one hydrocarbon group sigma-bonded to the nitrogen atom, a secondary amine having two hydrocarbon groups sigma-bonded to the nitrogen atom, and a tertiary amine having three sigma-bonded hydrocarbon groups. Moreover, ammonia can be utilized in the present invention; that is, ammonium carboxylic acid salts can be utilized. Amines having the nitrogen atom sigma-bonded to a primary, a secondary, or a tertiary carbon atom can also be utilized. In general, any amine that will initially form a salt with a carboxylic acid may be used in the present invention. Moreover, amines with more than one amine function in the molecule can be used, for example, di, tri, etc., amines.

Amines, diamines, or triamines, having one hydrocarbon portion thereon, are generally preferred. The hydrocarbon portions typically have from a total of from 1 to 20 carbon atoms. The hydrocarbon portion can be an aliphatic having from 1 to 20 carbon atoms and preferably from about 2 to 6 carbon atoms. The hydrocarbon portion can also be a cycloaliphatic or an aliphatic substituted cycloaliphatic having a total of from 5 to 20 carbon atoms and desirably from about 5 to about 8 carbon atoms. The hydrocarbon portion can also be an aromatic or an alkyl substituted aromatic having a total of from about 6 to about 20 carbon atoms and desirably from about 6 to about 14 carbon atoms. In addition to ammonia, examples of specific aliphatic amines include methyl, ethyl, n-propyl, isopropyl, n-, s-, and t-butyl amine, and the like. Examples of aliphatic diamines include ethylenediamine, 1,2-diaminopropane, 1,3-diaminopropane, the diaminobutanes, hexamethylenediamine, and the like. Examples of cycloaliphatic amines include cyclopentyl, cyclohexyl, and cycloheptylamines as well as the alkyl-substituted isomers thereof. Examples of cycloaliphatic diamines include 1,2-diaminocyclopentane; 1,2-diaminocyclohexane; 1,2-diaminocycloheptane and isomers thereof.

Relatively basic aromatic amines such as aniline, aminotoluenes, naphthylamines, etc., are examples of preferred aromatic amines. Examples of relatively basic aromatic diamines include 1,2-; 1,3-; and 1,4-diaminobenzene, diamine isomers of toluene, naphthalene and methylnapthalene, phenylenediamine, and the like. An example of a mixed aliphatic aromatic diamine is 4,4'-diphenylmethane diamine. Various secondary amines can also be utilized such as dimethyl-, diethyl-, di-n-propyl-, and di-isopropylamine. Tertiary amines such as trimethyl-, triethyl-, tri-n-propyl, tri-n-butylamines, and the like can also be utilized. Examples of triamines include trimethyl-, triethyl-, tri-n-propyl-, tri-isopropylamines, and the like.

The various monocarboxylic acids contain a total of from 1 to 20 carbon atoms and desirably from 2 to about 18 carbon atoms. The dicarboxylic acids generally contain from 2 to 20 carbon atoms and preferably from about 2 to about 18 carbon atoms. Examples of specific aliphatic monocarboxylic acids include formic acid, acetic acid, propionic acid, butyric acid, valeric acid, caproic acid, and the like. Examples of aliphatic dicarboxylic acids include oxalic acid, malonic acid, succinic acid, glutaric acid, adipic acid, pimelic acid, azelaic acid, and the like. Examples of cycloaliphatic carboxylic acids include cyclopentyl, cyclohexyl, and cycloheptyl carboxylic acids. Dicarboxylic acids of cyclopentane, cyclohexane, and cycloheptane are other examples. Examples of aromatic acids include benzoic, toluric, and naphthoic acids. Examples of aromatic dicarboxylic acids include 1,2-; 1,3-; and 1,4-dicarboxylbenzenes as well as the dicarboxyl derivative of naphthalene. Examples of preferred acids include oxalic acid, adipic acid, and terephthalic acid.

It will be obvious to those skilled-in-the-art that there are many combinations of basic nitrogen function compounds and carboxylic acids which will form salts. The type of basic nitrogen function compounds and carboxylic acids utilized will determine the solubility (and therefore the reactivity) of the salt in the polyurethane composition. Hereinafter, the basic nitrogen function compounds will be discussed with regard to amines. The salts may be "neutral"; that is, salts which do not contain free amine or carboxyl groups to react with the free isocyanate groups in the polyurethane composition. The "neutral" salts are believed to function as reinforcing fillers probably by pi-bonding with the urethane or urea groups of the polyurethane. Other amine/carboxylic acid salts could contain "free" amino or carboxyl functions and thus be incorporated into the polyurethane molecule by reaction with the free isocyanates to form sigma bonds. Depending upon the exact structure of the amine/carboxylic acid salt, some of the salts will be converted to amide functions at elevated temperatures. Regardless of the many possible combinations of amines and carboxylic acids to form salts and the different modes of reinforcing polyurethanes (pi or sigma bonding) as well as possible subsequent reaction of the salts to form amide functions, it has been determined that the amine salts have a beneficial effect of increasing the low-strain modulus of cured polyurethanes.

The amount of amine or diamine utilized with regard to the acid can vary depending upon whether free-amine groups are desired. That is, when diamines are utilized, an excessive amount of diamine can be utilized so that most, if not all, of the dicarboxylic acids are terminated with free-amine groups and the salt formed will have free amine functions which can react with the isocyanate functions of the polyisocyanate or urethane prepolymer.

For example, two moles of ethylenediamine and one mole of oxalic acid will form, as the major product, the following salt:

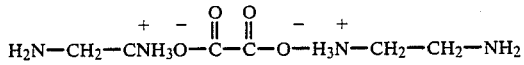

It is noted that the amine functions at the terminal positions are "free" and will react with the NCO functions of the polyisocyanate. Similarly, salts with "free" amine functions may be formed by using diamine/dicarboxylic acid ratios other than 2:1. For example, 3:2, 4:3, 5:4, etc. Such salts will also have "free" amine functions on the terminal positions.

Theoretically, the amine/carboxylic acid salts that are neutral (no free amine or carboxylic acid functions) will not be incorporated into the polyurethane molecule by sigma bonding. These salts may be formed via reaction of a mono-amine with a mono-carboxylic acid or by reacting a 2:1 molar ratio of a mono-amine with a dicarboxylic acid or a 1:2 molar ratio of a di-amine with a mono-carboxylic acid. Therefore, any enhancement of low strain modulus of the cured polyurethane containing these neutral salts must be due to secondary or pi bonding of the neutral salt with polar functions of the polyurethane. Henceforth, this end result is referred to as reinforcement of the polyurethane.

As noted above, when a molar ratio of 2:1 diamine:dicarboxylic acid is used to form the salt, the salt will have two free amine functions which can react with the free isocyanate functions of the polyisocyanate and/or urethane prepolymer. Theoretically, the salts with free amine functions would be incorporated into the polyurethane molecule. However, under practical conditions, the amount of the amine/carboxylic acid salts which contain free amine functions, that is, incorporated into the polyurethane molecule, will depend on the solubility of the salts in the prepolymer (reaction mixture). High molecular weight salts prepared with relatively high molecular weight diamines and dicarboxylic acids would be more soluble in the reaction mixture than salts prepared with relatively low molecular weight diamines and dicarboxylic acids and, thus, have a greater probability of being incorporated into the urethane molecule. It will be obvious to those skilled in the art that the choice of the molecular weight of the diamine and dicarboxylic acid will determine to a large extent the solubility of the salt which is formed in the reaction mixture and, thus, the probability of the salt being incorporated into the polyurethane molecule. In addition, the reaction conditions employed will determine to some extent the solubility of the salt in the reaction mixture and, thus, the probability of the salt being incorporated into the polyurethane molecule.

Another factor that must be considered is the type of diamine and dicarboxylic acid used relative to the type of urethane prepolymer used. Generally, an aliphatic diamine/dicarboxylic acid salt will be used with an aliphatic urethane prepolymer. An aromatic diamine/dicarboxylic acid salt will be used with an aromatic-type urethane prepolymer such as a polyester using an dicarboxylic aromatic acid to form the polyester.

Thus, the selection of the molecular weight and type of amine and carboxylic acid to form a salt will determine the solubility of the salt in the reaction mixture and, hence, the probability of the salt being incorporated into the polyurethane molecule. Accordingly, depending upon the various above factors, the amine salt containing free-amine functions thereon are at least partially incorporated into the polyurethane chain or substantially incorporated therein.

The amount of amine salts utilized is generally from about 0.001% to about 10% by weight based upon the total formulation weight, and preferably from about 0.05% to about 5%. The total formulation weight includes the weight of the prepolymer, the chain extender, and the salt.

The amine salts can be prepared either in an aqueous solution or in a solvent solution as known to the art as well as to the literature. When prepared in an aqueous solution, the salt solution is not added to the prepolymer due to the existence of free-isocyanate groups, but always to the intermediate. The intermediate-salt mixture is thus always dried before reaction with a polyisocyanate. Drying can be carried out according to any conventional manner such as by heating, subjecting the mixture to a vacuum, heating and applying a vacuum, and the like. When prepared in a solvent, the amine salt solution can be either added to the intermediate or to the prepolymer. Once again the solvent is removed according to any conventional manner as through heating, the application of a vacuum, heating and applying a vacuum, and the like. In addition, the salt may be prepared using the intermediate as a solvent by adding either the amine or carboxylic acid to the intermediate and subsequently adding either the amine or carboxylic acid to form the salt. Depending upon the salt, a preformed amine/carboxylic acid salt may be added directly to the intermediate.

Regardless of how the amine salt is added, the prepolymer formed is chain extended or cured with a curing agent such as those set forth hereinabove. A suitable amount of the chain extending agent can be utilized such that the overall stoichiometric ratio of hydroxyl (OH) or amine (NH) to isocyanate (NCO) is between 0.90 and 1.10, preferably 0.95 and 1.05 and most preferably about 1.0. The optimum amount of chain extender utilized will depend upon how much of the added salt reacts with the isocyanate functions which in turn generally depends upon the solubility of the salt in the reaction mixture.

The prepolymer can then be cured in a manner as noted hereinabove. The result is a polyurethane composition containing a reinforcing compound, that is the amine salt therein. Salts generally not containing free-amine end groups generally function as a reinforcing filler in the polyurethane composition. Accordingly, an improvement in the low-strain moduli, for example a 5% moduli, is obtained. That is, the stress at a 5% elongation is increased by at least 10% and desirably by at least 50%. When amine salts are utilized containing free-amine end groups, they are either partially or substantially incorporated into the polyurethane and yield a notably increased low-strain moduli. That is, at least an increase of 50% and desirably at least 100%. It is to be understood that not every salt containing a free-amine function or end group is wholly incorporated into the polyurethane but that on a statistical basis, many such salts are so incorporated. The factors that affect the amount of salt incorporated into the polyurethane molecule were discussed hereinabove.

Polyurethanes of the present invention are suitable wherever high low-strain moluli is desired as for example in cast tires.

The invention will be better understood by reference to the following examples.

EXAMPLE I

The following chemicals were utilized.

CHEMICALS

Ethylene diamine (EDA), terephthalic acid (TPA), oxalic acid (dihydrate), and adipic acid were reagent grade and used as received. Butanediol-1,4 (BDO), a curing agent, was obtained from E. I. duPont de Nemours and stored over 3A molecular sieves prior to use. Upjohn's Isonate 125M, 4,4'-diphenylmethane diisocyanate (MDI), was stored at 40° C. and used as received.

INTERMEDIATES

Voranol 5148: a product of Dow Chemical identified as a poly-(oxypropylene) triol having approximately 20% poly-(oxyethylene) glycol endblock and nominal 7000 molecular weight (PPO-EO-7000).

Voranol 2120: a poly(oxypropylene) diol: 2000 nominal molecular weight (PPO-2000).

Carbowax 400: a product of Union Carbide Chemical identified as a poly(oxyethylene) glycol; 400 nominal molecular weight (PEO-400).

S-105-55: a product of Ruco Polymer Corp. identified as poly(hexanediol-adipate) diol; 2000 nominal molecular weight (PE-2000).

PROCEDURE

The polyols with or without the amine salts were always dehydrated under vacuum (less than 5 torr) at 100° C. prior to use. It was assumed that the intermediate triols had three hydroxyl groups per molecule and that the intermediate diols had two hydroxyl groups per molecule when calculating stoichiometric quantities.

Prepolymers were prepared by adding MDI to the intermediate and then heating the mixture for 30 minutes at 100°-110° C. under vacuum to form the urethane prepolymers. The prepolymers were stored under nitrogen at 40° C. until used.

The amount of MDI used was varied to determine the effect of change in hard segment concentration on stress/strain properties. The weight % MDI in the formulation was reported as the hard segment concentration.

In all experiments, the calculated stoichiometry of OH/NCO was held at 1.00. When a salt with free functionality was used, the amount of curing agent was corrected to maintain a stoichiometry of 1.00.

For formulations containing a low molecular weight amine salt that was water soluble, the salt was prepared in an aqueous solution and the salt solution added to the polyol. The polyol/salt mixture was always dried under vacuum (less than 5 torr) at about 100° C. prior to reaction with MDI to form the prepolymer. If the salt was not soluble in water, the salt was usually prepared in tetrahydrofuran (THF) and the THF removed under vacuum prior to chain extension.

The molar ratio of amine/acid to form the salts is designated by either use of numerical prefixes or the use of the "bis" function; that is, bis(EDA)TPA means that 2 moles of ethylene diamine were reacted with one mole of terephthalic acid.

The prepolymer was chain extended at about 40° C. with the required amount of butanediol-1,4 (BDO), and the reaction allowed to proceed until a 5° C. exotherm was observed. The reaction mixture was then poured into a 6X6X0.075 inch steel mold and "cured" at 140° C. for 30 minutes under approximately 15 tons/square inch pressure.

Stress/strain data were obtained on an Instron tensile machine using specimens cut from the "cured" polyurethane.

RESULTS AND DISCUSSION

Bis(EDA)Dicarboxylic Acid Salts

Stress/strain data on urethane formulations containing EDA salts of oxalic, TPA, and adipic acids are summarized in Table I. Initially, the concentration of each salt was held constant at 0.45 wt.% of the total formulation. In all experiments, the experimental formulations had higher 5% moduli and tensile values than the control. However, the ultimate elongation values of the salt-containing formulations were all lower than the control. Since the polar salt (presumably present in the hard segment) would be expected to increase separation of the hard-soft-segment phases as well as increase domain cohesion, the salt concentration was varied from the initial 0.45% level to determine trends.

A general trend of higher low-strain moduli (both at 25° C. and 100° C.), at the lower salt levels can be noted in the data. Tensile and elongation values are not as significantly affected.

Since the degree of phase separation depends upon the polarity of both the soft and hard segments, the polarity of the soft segment was varied by utilization of different polyols. Specifically, a blend of the PPO-PEO-7000 with 10 and 30 parts of the polyester PE-2000 was evaluated with the EDA/TPA salt. To maximize the polarity differences, a blend of PPO-PEO-7000/PPO-2000 was also formulated with the EDA/TPA salt. Stress/strain data on these formulations are summarized in Table II.

Referring to Table II, it will be noted that the presence of the EDA/TPA salt always effected an increase in 5% moduli at both 25° C. and 100° C. Generally, the percent increases in low-strain moduli were greater at 100° C. then at 25° C. This general trend can also be noted in the data presented in Table I.

The effect of decreased polarity of the 70/30 PPO-PEO-7000/PPO-2000 soft segment composition is to enhance the effect of the EDA/TPA salt relative to increasing low-strain moduli. The percent increase in low-strain moduli for the 70/30 PPO-PEO-7000/PPO-2000 containing the EDA/TPA salt is approximately three times greater than that observed with the other compositions. However, a significant decrease in ultimate elongation was also observed with the less polar soft segment composition. Actually, all of the formulations containing 0.90 wt.% EDA/TPA had lower elongation values as compared to the appropriate control compositions. As pointed out in the discussion of the data in Table I, the lower concentration of EDA salts favors a greater increase in low-strain moduli and has less effect on elongation and tensile values.

To demonstrate the effectiveness of amine salts prepared at ratios other than 2:1 molar diamine:dicarboxylic acid, 1:1 molar salts of ethylene diamine of oxalic, terephthalic, and adipic acids were evaluated and the results thereof are summarized in Table III.

These 1:1 molar diamine:dicarboxylic acid salts would have significantly less "free" amino functions present to react with the NCO functions in the reaction mixture. Essentially, the salts would represent reinforcement via pi-bonding rather than sigma-bonding into the polyurethane molecule. The ultimate example would be amine salts prepared, as herein described, which have no free amino functions.

Referring to the data in Table III, it will be noted that the 1:1 molar ethylene diamine salts of oxalic, terephthalic, and adipic acids in all cases increased the 5% moduli over the moduli of the control which did not contain an amine salt. Generally, the degree of increase was somewhat less than observed with the amine salts that contain "free" amino functions to react with the NCO functions present in the polyurethane composition. However, the data does demonstrate that some increase in low-strain moduli can be effected by amine salts that are not incorporated into the polyurethane polymer molecule by a sigma bond.

TABLE I

90 PARTS PPO-PEO-7000/10 PARTS PEO-400;
33 WT % HARD SEGMENT PLUS WT. % EDA SALTS

| WT. % EDA Salt of | | | | | | | | | | |
|---|---|---|---|---|---|---|---|---|---|---|
| Oxalic | — | 0.23 | 0.45 | 0.90 | — | — | — | — | — | — |
| TPA | — | — | — | — | 0.23 | 0.45 | 0.90 | — | — | — |
| Adipic | — | — | — | — | — | — | — | 0.23 | 0.45 | 0.90 |
| 25° C. Stress, MPa, at Strain | | | | | | | | | | |
| 5% | 2.74 | 4.87 | 3.95 | 3.31 | 5.00 | 3.05 | 4.03 | 4.71 | 3.74 | 2.74 |
| Break | 18.02 | 20.06 | 20.07 | 19.41 | 23.92 | 19.59 | 23.28 | 19.41 | 18.94 | 17.32 |
| % Elong. At Break | 490 | 410 | 410 | 420 | 460 | 400 | 470 | 390 | 380 | 380 |
| 100° C. Stress, MPa, At Strain | | | | | | | | | | |
| 5% | 1.75 | 3.23 | 2.81 | 2.29 | 3.25 | 2.08 | 2.72 | 3.11 | 2.63 | 1.70 |
| Break | 11.07 | 5.96 | 12.35 | 9.89 | 6.99 | 13.69 | 9.83 | 7.79 | 11.86 | 8.58 |
| % Elong. At Break | 330 | 170 | 350 | 230 | 220 | 280 | 230 | 210 | 280 | 230 |

TABLE II

VARIATION OF SOFT SEGMENTS

| Parts by Wt. | | | | | | |
|---|---|---|---|---|---|---|
| PPO-PEO-7000 | 90 | 90 | 70 | 70 | 70 | 70 |
| PE-2000 | 10 | 10 | 30 | 30 | — | — |
| PPO-2000 | — | — | — | — | 30 | 30 |
| Wt. % EDA/TPA | — | 0.90 | — | 0.90 | — | 0.90 |
| 31.3 Segment | 30.5 | 30.3 | 31.3 | 31.3 | 31.3 | 31.1 |
| 25° C. Stress, MPa, At strain | | | | | | |
| 5% | 2.61 | 3.89 | 3.54 | 4.98 | 1.74 | 4.03 |
| Break | 17.79 | 19.97 | 25.17 | 15.92 | 16.95 | 10.19 |
| % Elong. | 450 | 460 | 600 | 350 | 570 | 180 |
| At Break 100° C. Stress, MPa, At Strain | | | | | | |
| 5% | 1.88 | 2.93 | 2.19 | 3.36 | 1.14 | 2.95 |
| Break | 12.48 | 9.83 | 7.05 | 6.76 | 5.98 | 7.63 |
| % Elong. At Break | 310 | 190 | 220 | 170 | 240 | 100 |

TABLE III

90 Parts PPO-PEO-7000/10 Parts PEO-400;
33 Wt. % Hard Segment
Plus 1.0 Wt. % 1:1 EDA/Dicarboxylic Acid Salts

| Wt. % EDA Salt of | | | | |
|---|---|---|---|---|
| Oxalic | — | 1.00 | — | — |
| TPA | — | — | 1.00 | — |
| ADIPIC | — | — | — | 1.00 |
| 25° C. Stress, MPa | | | | |

TABLE III-continued

90 Parts PPO-PEO-7000/10 Parts PEO-400;
33 Wt. % Hard Segment
Plus 1.0 Wt. % 1:1 EDA/Dicarboxylic Acid Salts

| at Strain | | | | |
|---|---|---|---|---|
| 5% | 2.74 | 3.21 | 3.02 | 2.96 |
| Break | 18.02 | 22.10 | 19.16 | 13.20 |
| % Elong. At Break | 490 | 500 | 440 | 285 |
| 100° C. Stress, MPa, at Strain | | | | |
| 5% | 1.75 | 2.24 | 2.01 | 1.97 |
| Break | 11.07 | 10.25 | 9.63 | 7.14 |
| % Elong. At Break | 330 | 325 | 260 | 150 |

While in accordance with the Patent Statutes, a best mode and preferred embodiment has been set forth. The scope of the invention is not limited thereto, but rather by the scope of the attached claims.

What is claimed is:

1. A polyurethane composition, comprising:
a polyurethane and an effective amount of a salt to increase the low-strain moduli of said polyurethane, said salt being the reaction product of (a) a basic nitrogen function compound, and (b) a monocarboxylic acid, a dicarboxylic acid, or combinations thereof, the equivalent ratio of said acid to said basic nitrogen compound being at least 1 to 2.

2. A polyurethane composition according to claim 1, wherein said basic nitrogen function compound is ammonia, urea, substituted urea, an amine, a diamine, a triamine, or combinations thereof, wherein said amine, said diamine, and said triamine have a hydrocarbon portion, wherein said amine hydrocarbon portion is an aliphatic having from 1 to 20 carbon atoms, a cycloaliphatic or an alkyl substituted cycloaliphatic having from 5 to 20 carbon atoms, or an aromatic or an alkyl substituted aromatic having from 6 to 20 carbon atoms, wherein said monocarboxylic acid has from 1 to 20 carbon atoms, wherein said dicarboxylic acid has from 2 to 20 carbon atoms, and wherein said effective amount of said amine salt is from about 0.001% to about 10.0% by weight based upon the total formulation weight, and wherein said equivalent ratio of said acid to said basic nitrogen compound is at least 2 to 3.

3. A polyurethane composition according to claim 2, wherein said amine, said diamine and said triamine have a single hydrocarbon portion, wherein said amine hydrocarbon portion is an aliphatic having from 2 to 6 carbon atoms, a cycloaliphatic or an alkyl substituted cycloaliphatic having from 5 to 8 carbon atoms, or an aromatic or an alkyl substituted aromatic having from 6 to 14 carbon atoms, wherein said monocarboxylic acid has from 2 to 18 carbon atoms, wherein said dicarboxylic acid has from 2 to 18 carbon atoms, and wherein the amount of said amine salt is from about 0.05% to about 5% by weight based upon the total formulation weight.

4. A polyurethane composition according to claim 3, wherein said amine is ethylene diamine, hexamethylenediamine, or para-phenylenediamine, and wherein said acid is terephthalic acid, oxalic acid, or adipic acid.

5. A polyurethane composition according to claim 4, wherein said amine salt has a free-amine group therein and wherein said free-amine group is at least partially incorporated into said polyurethane so that said polyurethane has at least a 50% increase in low strain modulus.

6. A polyurethane composition according to claim 3, wherein said amine salt is a neutral salt and acts as a reinforcing filler in said polyurethane composition.

7. A cured polyurethane composition comprising:
a polyurethane and from about 0.001% to about 10% by weight of an amine salt based upon the total weight of said polyurethane and said amine salt, said salt being the reaction product of (a) ammonia, urea, substituted area, an amine, a diamine, a triamine, or combinations thereof, and (b) a monocarboxylic acid, a dicarboxylic acid, or combinations thereof, the equivalent ratio of said acid to said basic nitrogen compound being at least 1 to 2.

8. A cured polyurethane composition according to claim 7, wherein said amine, said diamine, and said triamine have at least 1 or more hydrocarbon portions, wherein said amine hydrocarbon portion is an aliphatic having from 1 to 20 carbon atoms, a cycloaliphatic or an alkyl substituted cycloaliphatic having from 5 to 20 carbon atoms, or an aromatic or an alkyl substituted aromatic having from 6 to 20 carbon atoms, wherein said monodicarboxylic acid has from 1 to 20 carbon atoms, wherein said dicarboxylic acid has from 2 to 20 carbon atoms, and wherein said equivalent ratio of said acid to said basic nitrogen compound is at least 2 to 3.

9. A cured polyurethane composition according to claim 8, wherein said amine, said diamine, and said triamine have a single hydrocarbon portion, wherein said amine hydrocarbon portion is an aliphatic having from 2 to 6 carbon atoms, a cycloaliphatic or an alkyl substituted cycloaliphatic having from 5 to 8 carbon atoms, or an aromatic or an alkyl substituted aromatic having from 6 to 14 carbon atoms, wherein said monocarboxylic acid has from 2 to 18 carbon atoms, wherein said dicarboxylic acid has from 2 to 18 carbon atoms, and wherein the amount of said amine salt is from about 0.05% to about 5% by weight based upon the total weight of said polyurethane and said amine salt.

10. A cured polyurethane composition according to claim 9, wherein said amine is ethylene diamine, hexamethylenediamine, or para-phenylenediamine, and wherein said acid is terephthalic acid, oxalic acid, or adipic acid.

11. A cured polyurethane composition according to claim 7, wherein said urethane is made from an intermediate and a polyisocyanate, wherein said intermediate is a medium or low molecular weight hydroxyl terminated polyether, and wherein said polyisocyanate has the formula $$R+N=C=O)_n$$

wherein R is an aromatic or an alkyl substituted aromatic having from 6 to 20 carbon atoms, and wherein n is 2 or 3.

12. A cured polyurethane composition according to claim 9, wherein said urethane is made from an intermediate and a polyisocyanate, wherein said intermediate is a medium or low molecular weight hydroxyl terminated polyether, and wherein said polyisocyanate has the formula $$R+N=C=O)_n$$

wherein R is an aromatic or an alkyl substituted aromatic containing from 6 to 20 carbon atoms, and wherein n is 2 or 3.

13. A cured polyurethane composition according to claim 12, wherein said polyurethane is cured with a polyol, and wherein said polyol is a low or intermediate molecular weight alkyl diol.

14. A cured polyurethane composition according to claim 7, wherein said amine salt contains at least two free-amine groups therein, and wherein said free-amine groups are partially incorporated into said polyurethane.

15. A cured polyurethane composition according to claim 9, wherein said amine salt contains at least two free-amine groups therein, and wherein said free-amine groups are substantially incorporated into said polyurethane.

16. A cured polyurethane composition according to claim 12, wherein said amine salt contains at least two free-amine groups therein, and wherein said free-amine groups are partially incorporated into said polyurethane.

17. A cured polyurethane composition according to claim 7, wherein said amine salt is a neutral salt.

18. A cured polyurethane composition according to claim 11, wherein said amine salt is a neutral salt.

* * * * *